United States Patent
Wang et al.

(10) Patent No.: US 11,653,251 B2
(45) Date of Patent: May 16, 2023

(54) PACKET FORWARDING METHOD AND APPARATUS

(71) Applicant: Huawei Technologies Co., Ltd., Shenzhen (CN)

(72) Inventors: Zhen Wang, Beijing (CN); Xiaozhong Wang, Beijing (CN); Jian Song, Beijing (CN); Wenbin Yang, Beijing (CN); Xiquan Zhao, Shenzhen (CN); Degao Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 17/154,759

(22) Filed: Jan. 21, 2021

(65) Prior Publication Data
US 2021/0227424 A1 Jul. 22, 2021

(30) Foreign Application Priority Data
Jan. 21, 2020 (CN) .......................... 202010072416.X

(51) Int. Cl.
*H04W 28/02* (2009.01)
(52) U.S. Cl.
CPC ... *H04W 28/0268* (2013.01); *H04W 28/0236* (2013.01)
(58) Field of Classification Search
None
See application file for complete search history.

(56) References Cited

U.S. PATENT DOCUMENTS

| | | | |
|---|---|---|---|
| 7,817,549 B1 * | 10/2010 | Kasralikar | H04L 43/026 370/235 |
| 9,641,803 B1 | 5/2017 | Badr et al. | |
| 2003/0023733 A1 * | 1/2003 | Lingafelt | H04L 47/10 709/229 |
| 2010/0165878 A1 * | 7/2010 | Soni | H04L 67/12 370/254 |

(Continued)

FOREIGN PATENT DOCUMENTS

| CN | 107342906 A | 11/2017 |
|---|---|---|
| CN | 107786294 A | 3/2018 |

(Continued)

OTHER PUBLICATIONS

Chao et al., "Flow Classification for Software-Defined Data Centers Using Stream Mining," IEEE Transactions on Services Computing, vol. 12, No. 1, pp. 105-116, XP011708333, Institute of Electrical and Electronics Engineers, New York, New York (Jan./Feb. 2019).

(Continued)

*Primary Examiner* — Andre Tacdiran
(74) *Attorney, Agent, or Firm* — Leydig, Voit & Mayer, Ltd.

(57) ABSTRACT

A packet forwarding method to shorten a transmission latency of an elephant flow is provided. In the method, for a first packet flow used as an elephant flow, a network device may receive a plurality of packets of the first packet flow, and determine a characteristic parameter of the first packet flow based on the plurality of packets, where the characteristic parameter of the first packet flow is used to indicate a transmission latency of the first packet flow. After determining the characteristic parameter of the first packet flow, the network device determines a forwarding policy of the first packet flow based on the characteristic parameter of the first packet flow. The forwarding policy of the first packet flow is used to indicate latency sensitivity of the first packet flow.

16 Claims, 3 Drawing Sheets

(56) References Cited

U.S. PATENT DOCUMENTS

| | | | |
|---|---|---|---|
| 2011/0138463 A1* | 6/2011 | Kim | H04L 63/1458 |
| | | | 726/22 |
| 2011/0142103 A1* | 6/2011 | Suzuki | H04L 69/40 |
| | | | 375/211 |
| 2016/0105343 A1 | 4/2016 | Janarthanan et al. | |
| 2017/0317938 A1* | 11/2017 | Abraham | H04L 47/24 |
| 2018/0109973 A1* | 4/2018 | Krendzel | H04L 45/38 |
| 2019/0386924 A1 | 12/2019 | Srinivasan et al. | |

FOREIGN PATENT DOCUMENTS

| | | | |
|---|---|---|---|
| CN | 108712773 | * | 5/2018 |
| CN | 110035019 A | | 7/2019 |
| CN | 110213129 A | | 9/2019 |
| JP | 2018152675 | * | 9/2018 |
| WO | 2019238058 A1 | | 12/2019 |

OTHER PUBLICATIONS

Raza et al., "A priority based greedy path assignment mechanism in OpenFlow based datacenter networks," Journal of Network and Computer Applications, vol. 163, Academic Press, pp. 1-11, XP086159461, Elsevier Ltd. (Apr. 7, 2020).
Zhuo Ning et al., "A Sampling Method for IDS in High Bandwidth Network," Total 12 pages (2009). With an English Abstract.
CN/202010072416.X, Notice of Allowance/Search Report, dated May 19, 2022.

* cited by examiner

PACKET FORWARDING METHOD AND APPARATUS

CROSS-REFERENCE TO RELATED APPLICATIONS

This application claims priority to Chinese Patent Application No. 202010072416.X, filed on Jan. 21, 2020, which is hereby incorporated by reference in its entirety.

TECHNICAL FIELD

Embodiments of this application relate to the communications field, and in particular, to a packet forwarding method and apparatus.

BACKGROUND

A network device may forward a packet. Specifically, the network device may forward a plurality of types of service packets. When forwarding a packet, the network device may use a corresponding forwarding policy, to ensure quality of service (QoS) of a service. The following example is used to describe forwarding the packet by the network device by using the forwarding policy: For a to-be-forwarded packet, the network device may determine a priority of the packet, and forward the packet based on the priority of the packet. The quality of service of the service may be reflected by a transmission latency of the service packet.

A forwarding policy used by a network device in a conventional technology cannot meet a transmission latency requirement of some service packets.

SUMMARY

Embodiments of this application provide a packet forwarding method, to shorten a packet transmission latency.

According to a first aspect, an embodiment of this application provides a packet forwarding method. The packet forwarding method can shorten a transmission latency of an elephant flow. In the method, for a first packet flow used as an elephant flow, a network device may receive a plurality of packets of the first packet flow, and determine a characteristic parameter of the first packet flow based on the plurality of packets. The characteristic parameter of the first packet flow is used to indicate a transmission latency of the first packet flow. After determining the characteristic parameter of the first packet flow, the network device determines a forwarding policy of the first packet flow based on the characteristic parameter of the first packet flow. The forwarding policy of the first packet flow is used to indicate latency sensitivity of the first packet flow. It may be understood that, because the determined forwarding policy of the first packet flow can indicate the latency sensitivity of the first packet flow, forwarding the first packet flow based on the forwarding policy of the first packet flow may make an actual transmission latency of the first packet flow match the latency sensitivity of the first packet flow, thereby shortening the transmission latency of the first packet flow used as an elephant flow.

In a possible implementation, the characteristic parameter of the first packet flow may be a statistical characteristic of the first packet flow, the characteristic parameter of the first packet flow may be used to indicate the transmission latency of the first packet flow, and the latency sensitivity of the first packet flow may be determined based on the characteristic parameter of the first packet flow. In some embodiments, some elephant flows with low latency sensitivity each have a relatively large packet time interval, for example, maximum packet time interval or packet time interval fluctuation coefficient. Some elephant flows with high latency sensitivity each have a relatively small packet time interval, for example, maximum packet time interval. Therefore, latency sensitivity of an elephant flow may be determined based on a packet time interval. Therefore, in an embodiment, the characteristic parameter may include a packet time interval. In some embodiments, considering that a rate of an elephant flow with high latency sensitivity is usually relatively stable, and a rate of an elephant flow with low latency sensitivity fluctuates relatively greatly, latency sensitivity of an elephant flow may be determined based on a rate fluctuation coefficient of the elephant flow. Therefore, the characteristic parameter may further include a rate fluctuation coefficient.

In a possible implementation, the forwarding policy is used to indicate a specific packet flow forwarding manner. When forwarding a packet flow, the network device usually needs to determine a priority of the packet flow, to determine a packet egress queue that the packet flow is to enter. In addition, in a process of forwarding the packet flow, a forwarding path of the packet flow may be further determined. Therefore, the forwarding policy may include any one or two of a packet priority and a forwarding path.

In a possible implementation, when the characteristic parameter of the first packet flow includes the packet time interval of the first packet flow, each time the network device receives a packet, the network device may record a receiving moment of the packet, and calculate a difference between the current moment and a receiving moment of a previous packet, to obtain a packet time interval. However, because the network device receives a relatively large quantity of packets, if each time the network device receives a packet, the network device correspondingly records a receiving moment of the packet and calculates a packet time interval, a relatively large quantity of calculation resources are consumed. To resolve this problem, in an embodiment, the network device may allocate a counter to record a quantity of received packets of the first packet flow, and determine a value of the counter based on a first cycle in a first time period. If none of values of the counter in K consecutive cycles changes, it indicates that the network device does not receive a new packet in any of the K cycles. Therefore, the network device may determine that the packet time interval is K times the first cycle. The first time period may also be understood as duration of the plurality of packets.

In a possible implementation, when the characteristic parameter of the first packet flow includes the rate fluctuation coefficient of the first packet flow, the network device may determine a rate of the first packet flow based on an obtained packet of the first packet flow and based on a second cycle in a first time period. The first time period may include a plurality of second cycles. Therefore, the network device may determine a plurality of rates in the first time period. After determining the plurality of rates, the network device may calculate the rate fluctuation coefficient of the first packet flow based on the plurality of rates.

In a possible implementation, that the network device determines a forwarding policy of the first packet flow based on the characteristic parameter of the first packet flow may include a plurality of implementations. Implementation 1: The characteristic parameter of the first packet flow includes the packet time interval of the first packet flow and does not include the rate fluctuation coefficient of the first packet flow. In this case, the network device may compare the time interval of the first packet flow with a first threshold. When the time interval of the first packet flow is less than the first threshold, the network device may determine that the forwarding policy of the first packet flow is a first forwarding policy. The first forwarding policy indicates that the first packet flow has high latency sensitivity. Correspondingly, when the network device determines that the packet time interval of the first packet flow is greater than or equal to the first threshold, the network device may determine that the forwarding policy of the first packet flow is a second forwarding policy. The second forwarding policy indicates that the first packet flow has low latency sensitivity. Implementation 2: The characteristic parameter of the first packet flow includes the rate fluctuation coefficient of the first packet flow and does not include the packet time interval of the first packet flow. In this case, the network device may compare the rate fluctuation coefficient of the first packet flow with a second threshold. When the rate fluctuation coefficient of the first packet flow is less than the second threshold, the network device may determine that the forwarding policy of the first packet flow is a first forwarding policy. The first forwarding policy indicates that the first packet flow has high latency sensitivity. Correspondingly, when the network device determines that the rate fluctuation coefficient of the first packet flow is greater than or equal to the second threshold, the network device may determine that the forwarding policy of the first packet flow is a second forwarding policy. The second forwarding policy indicates that the first packet flow has low latency sensitivity. Implementation 3: The characteristic parameter of the first packet flow includes the packet time interval of the first packet flow and the rate fluctuation coefficient of the first packet flow. In this case, the network device may compare the time interval of the first packet flow with a first threshold, and compare the rate fluctuation coefficient of the first packet flow with a second threshold. When the packet time interval of the first packet flow is less than the first threshold and the rate fluctuation coefficient of the first packet flow is less than the second threshold, the network device may determine that the forwarding policy of the first packet flow is a first forwarding policy. The first forwarding policy indicates that the first packet flow has high latency sensitivity.

In a possible implementation, in addition to the first packet flow, the network device may further receive a second packet flow, and the second packet flow is also an elephant flow. After receiving a plurality of packets of the second packet flow, the network device may calculate a characteristic parameter of the second packet flow based on the plurality of packets of the second packet flow, and determine a forwarding policy of the second packet flow based on the characteristic parameter of the second packet flow. The characteristic parameter of the second packet flow is used to indicate a transmission latency of the second packet flow, and the forwarding policy of the second packet flow is used to indicate latency sensitivity of the second packet flow. After determining the forwarding policy of the first packet flow, the network device may forward the first packet flow based on the forwarding policy of the first packet flow. Correspondingly, after determining the forwarding policy of the second packet flow, the network device may forward the second packet flow based on the forwarding policy of the second packet flow. If the latency sensitivity of the first packet flow is different from the latency sensitivity of the second packet flow, the packet flow priority indicated by the forwarding policy of the first packet flow is different from a packet flow priority indicated by the forwarding policy of the second packet flow, or costs of the forwarding path indicated by the forwarding policy of the first packet flow are different from costs of a forwarding path indicated by the forwarding policy of the second packet flow. In an embodiment, if the latency sensitivity of the first packet flow is higher than the latency sensitivity of the second packet flow, the packet flow priority indicated by the forwarding policy of the first packet flow is higher than the packet flow priority indicated by the forwarding policy of the second packet flow, or the costs of the forwarding path indicated by the forwarding policy of the first packet flow are lower than the costs of the forwarding path indicated by the forwarding policy of the second packet flow. Therefore, a latency of forwarding the first packet flow by the network device is lower than a latency of forwarding the second packet flow by the network device, so that a latency of forwarding a packet flow by the network device matches latency sensitivity of the packet flow.

According to a second aspect, an embodiment of this application provides a packet forwarding apparatus. The apparatus includes a first receiving unit, configured to receive a plurality of packets of a first packet flow, where the first packet flow is an elephant flow; a first determining unit, configured to determine a characteristic parameter of the first packet flow based on the plurality of packets, where the characteristic parameter is used to indicate a transmission latency of the first packet flow; and a second determining unit, configured to determine a forwarding policy of the first packet flow based on the characteristic parameter of the first packet flow, where the forwarding policy is used to indicate latency sensitivity of the first packet flow.

In a possible implementation, the characteristic parameter includes a packet time interval and/or a rate fluctuation coefficient. The packet time interval is a difference between receiving moments of two adjacent packets in the plurality of packets, and the rate fluctuation coefficient is used to indicate a rate change of the first packet flow.

In a possible implementation, the forwarding policy includes a packet flow priority and/or a forwarding path. The packet flow priority is directly proportional to packet flow latency sensitivity, and transmission quality of the forwarding path is directly proportional to the packet flow latency sensitivity.

In a possible implementation, when the characteristic parameter of the first packet flow includes the packet time interval of the first packet flow, the first determining unit is specifically configured to: determine a quantity of obtained packets of the first packet flow based on a first cycle in a first time period; and if none of quantities of packets obtained for K consecutive times changes, determine that the packet time interval is K times the first cycle, where the plurality of packets are packets obtained in the first time period.

In a possible implementation, when the characteristic parameter of the first packet flow includes the rate fluctuation coefficient of the first packet flow, the first determining unit is specifically configured to determine a rate of the first packet flow based on an obtained packet of the first packet flow and based on a second cycle in a first time period, where the plurality of packets are packets obtained in the first time period; and calculate the rate fluctuation coefficient of the first packet flow based on a plurality of rates determined in the first time period.

In a possible implementation, when the characteristic parameter includes the packet time interval and does not include the rate fluctuation coefficient, the second determining unit is specifically configured to: when the packet time interval of the first packet flow is less than a first threshold, determine that the forwarding policy of the first packet flow is a first forwarding policy, where the first forwarding policy indicates that the first packet flow has high latency sensitivity. When the characteristic parameter includes the rate fluctuation coefficient and does not include the packet time interval, the second determining unit is specifically configured to: when the rate fluctuation coefficient of the first packet flow is less than a second threshold, determine that the forwarding policy of the first packet flow is a first forwarding policy, where the first forwarding policy indicates that the first packet flow has high latency sensitivity. When the characteristic parameter includes the packet time interval and the rate fluctuation coefficient, the second determining unit is specifically configured to: when the packet time interval of the first packet flow is less than a first threshold and the rate fluctuation coefficient of the first packet flow is less than a second threshold, determine that the forwarding policy of the first packet flow is a first forwarding policy, where the first forwarding policy indicates that the first packet flow has high latency sensitivity.

In a possible implementation, the apparatus further includes a second receiving unit, configured to receive a second packet flow, where the second packet flow is an elephant flow; and a forwarding unit, configured to forward the first packet flow based on the forwarding policy of the first packet flow, and forward the second packet flow based on a forwarding policy of the second packet flow, where the packet flow priority indicated by the forwarding policy of the first packet flow is higher than a packet flow priority indicated by the forwarding policy of the second packet flow.

In a possible implementation, the apparatus further includes: a second receiving unit, configured to receive a second packet flow, where the second packet flow is an elephant flow, and a destination device of the second packet flow is the same as a destination device of the first packet flow; and a forwarding unit, configured to forward the first packet flow based on the forwarding policy of the first packet flow, and forward the second packet flow based on a forwarding policy of the second packet flow, where costs of the forwarding path indicated by the forwarding policy of the first packet flow are lower than costs of a forwarding path indicated by the forwarding policy of the second packet flow.

According to a third aspect, an embodiment of this application provides a packet forwarding device, including a processor and a memory. The memory is configured to store an instruction or a computer program. The processor is configured to execute the instruction or the computer program, to perform the method according to any implementation of the first aspect.

According to a fourth aspect, an embodiment of this application provides a computer-readable storage medium, including an instruction or a computer program. When the instruction or the computer program is run on a computer, the computer is enabled to perform the method according to any implementation of the first aspect.

According to a fifth aspect, an embodiment of this application provides a computer program product including an instruction. When the computer program product is run on a computer, the computer is enabled to perform the method according to any implementation of the first aspect.

BRIEF DESCRIPTION OF DRAWINGS

To describe the technical solutions in the embodiments of this application more clearly, the following briefly describes the accompanying drawings for describing the embodiments. It is clearly that the accompanying drawings in the following description show some embodiments of this application, and persons of ordinary skill in the art may still derive other drawings from these accompanying drawings without creative efforts.

DESCRIPTION OF EMBODIMENTS

Embodiments of this application provide a packet forwarding method, to shorten a transmission latency of an elephant flow with high latency sensitivity.

Figure 1:
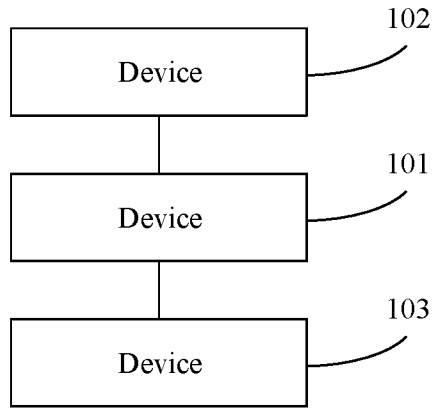
FIG. 1 is a schematic diagram of an example of an application scenario.

For ease of understanding, a possible application scenario of the embodiments of this application is first described. FIG. 1 is a schematic diagram of an example of an application scenario. Before the scenario shown in FIG. 1 is described, a concept of "packet flow" in the following embodiments is first described.

In a transmission process, a packet may carry information related to packet transmission. The information may be a 2-tuple, a 5-tuple, or a 7-tuple. The 2-tuple includes a source Internet protocol (IP) address and a destination IP address. The 5-tuple includes a source IP address, a source port number, a destination IP address, a destination port number, and a transport layer protocol number. The 7-tuple includes a source media access control (MAC) address, a destination MAC address, a source IP address, a destination IP address, a protocol number, a source port number, and a destination port number. If a plurality of packets consecutively transmitted between two nodes carry the same foregoing information, the consecutive packets may also be referred to as a packet flow. Therefore, a packet flow to which a packet belongs may be determined by using information carried in the packet, such as a 2-tuple, a 5-tuple, a 7-tuple, or other information that may be used to distinguish between packet flows.

The following describes the scenario shown in FIG. 1.

In the scenario shown in FIG. 1, a device 101 may obtain a packet from a device 102, and forward the packet to a device 103. Specific forms of the device 101, the device 102, and the device 103 are not specifically limited in this embodiment of this application. For example, the device 101 may be a network device such as a router or a switch. The device 102 may be a network device such as a router or a switch, or may be a device such as a server or a terminal device. The device 103 may be a network device such as a router or a switch, or may be a device such as a server or a terminal device. When forwarding a packet, the device 101 may forward the packet based on a forwarding policy. The forwarding policy mentioned herein may be used to indicate, for example, one or two of a packet flow priority and a forwarding path.

It should be noted that FIG. 1 is illustrated only for ease of understanding the application scenario of the embodiments of this application, and constitutes no limitation on the embodiments of this application.

Packets obtained by the device 101 may correspond to a plurality of services, such as a video conferencing service, a virtual reality (VR) service, or a video on demand service. Packet flows corresponding to different services have different latency sensitivity. For example, a packet flow corresponding to the video conferencing service and a packet flow corresponding to the VR service have relatively high latency sensitivity; in other words, the packet flow corresponding to the video conferencing service and the packet flow corresponding to the VR service require relatively short packet flow completion time. A packet flow corresponding to the video on demand service has relatively low latency sensitivity, and therefore the packet flow corresponding to the video on demand service allows relatively long flow completion time.

In a conventional technology, if a packet flow is an elephant flow, the device 101 cannot identify latency sensitivity of the elephant flow. In addition, due to a relatively large quantity of mice flows in a network, to ensure a relatively low transmission latency of the mice flow, the device 101 usually forwards the elephant flow based on a relatively low packet priority. Therefore, in the conventional technology, quality of service of a service corresponding to an elephant flow cannot be ensured.

In view of this, the embodiments of this application provide a packet forwarding method. The method may be used to make an actual transmission latency of a first packet flow used as an elephant flow match latency sensitivity of the first packet flow, thereby shortening a transmission latency of the first packet flow used as an elephant flow. With reference to the accompanying drawings, the following describes the packet processing method provided in the embodiments of this application.

Figure 2:
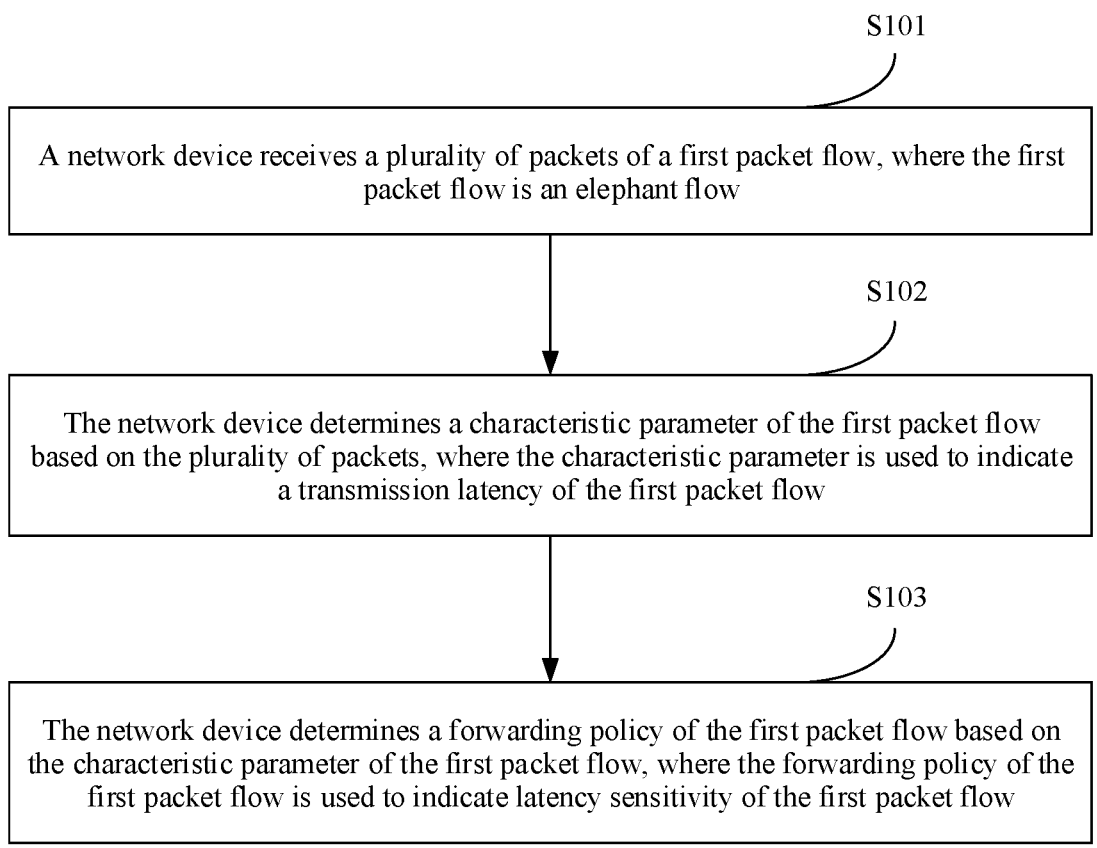
FIG. 2 is a schematic flowchart of a packet forwarding method according to an embodiment of this application.

FIG. 2 is a schematic flowchart of a packet forwarding method according to an embodiment of this application. For example, the packet forwarding method shown in FIG. 2 may be implemented by using the following S101 to S103.

S101. A network device receives a plurality of packets of a first packet flow, where the first packet flow is an elephant flow.

In this embodiment of this application, the network device may be an intermediate node that forwards the first packet flow. The network device may receive the plurality of packets from another device. After receiving the plurality of packets, the network device may forward the plurality of packets to another device. The network device mentioned in this embodiment of this application may be, for example, the device 101 shown in FIG. 1.

S102. The network device determines a characteristic parameter of the first packet flow based on the plurality of packets, where the characteristic parameter is used to indicate a transmission latency of the first packet flow.

In this embodiment of this application, the characteristic parameter of the first packet flow may be a statistical characteristic of the first packet flow, the characteristic parameter of the first packet flow may be used to indicate a transmission latency of the first packet flow, and latency sensitivity of the first packet flow may be determined based on the characteristic parameter of the first packet flow. In other words, the characteristic parameter of the first packet flow may be one or more parameters that can determine the latency sensitivity of the first packet flow. The latency sensitivity of the first packet flow may correspond to a transmission latency requirement of the first packet flow. Higher latency sensitivity of the first packet flow indicates that the first packet flow requires a lower transmission latency, and lower latency sensitivity of the first packet flow indicates that the first packet flow can allow a higher transmission latency.

In some embodiments, some elephant flows with low latency sensitivity cause relatively large data traffic. To reduce central processing unit (CPU) overheads required for processing the data traffic, a server that processes the elephant flow usually sends a large quantity of packets in batches periodically. As a result, the elephant flow has a relatively large packet time interval, for example, maximum packet time interval or packet time interval fluctuation coefficient. The packet time interval mentioned herein is a difference between moments at which the network device receives adjacent packets. Some elephant flows with high latency sensitivity have a relatively high requirement for real-time quality. Therefore, a server that processes the elephant flow usually sends packets in real time consecutively. As a result, the elephant flow has a relatively small packet time interval, for example, maximum packet time interval. Therefore, latency sensitivity of an elephant flow may be determined based on a packet time interval. Therefore, in an embodiment, the characteristic parameter may include a packet time interval. The packet time interval mentioned herein includes but is not limited to a maximum packet time interval or a packet time interval fluctuation coefficient. The packet time interval fluctuation coefficient mentioned herein is used to indicate, for example, a packet time interval change, and the packet time interval fluctuation coefficient may be, for example, a packet time interval variance.

In an implementation, when the characteristic parameter of the first packet flow includes the packet time interval of the first packet flow, during specific implementation, S102 may be, for example, as follows: Each time the network device receives a packet, the network device may record a receiving moment of the packet, and calculate a difference between the current moment and a receiving moment of a previous packet, to obtain a packet time interval. However, because the network device receives a relatively large quantity of packets, if each time the network device receives a packet, the network device correspondingly records a receiving moment of the packet and calculates a packet time interval, a relatively large quantity of calculation resources are consumed. To resolve this problem, in an embodiment, the network device may allocate a counter to record a quantity of received packets of the first packet flow, and determine a value of the counter based on a first cycle in a first time period. If none of values of the counter in K consecutive cycles changes, it indicates that the network device does not receive a new packet in any of the K cycles. Therefore, the network device may determine that the packet time interval is K times the first cycle. All the plurality of packets mentioned in S101 are packets received by the network device in the first time period, and the first time period may also be understood as duration of the plurality of packets. In this embodiment of this application, the first cycle is not specifically limited. Considering that in an actual application, the packet time interval can reach a packet time interval accuracy requirement provided that the packet time interval is accurate to a level of 100 milliseconds, the first cycle may be, for example, 100 milliseconds. Specifically, in an actual application, the network device may include a network processor (NP) and a central processing unit (CPU). The NP is a switch of a forwarding plane, and the CPU is a controller of a control plane. The operation of recording a quantity of received packets of the first packet flow may be performed by the NP, and the step of calculating the packet time interval may be performed by the CPU. It should be noted that K is an integer. It may be understood that when K is 0, it indicates that the network device receives a new packet of the first packet flow in one first cycle. In this case, the packet time interval may be considered as 0 because the packet time interval is less than 100 milliseconds.

In some embodiments, considering that a rate of an elephant flow with high latency sensitivity is usually relatively stable, and a rate of an elephant flow with low latency sensitivity fluctuates relatively greatly, latency sensitivity of an elephant flow may be determined based on a rate fluctuation coefficient of the elephant flow. The rate fluctuation coefficient is used to indicate a packet flow rate change, or may be used to indicate packet flow rate stability. Therefore, in another implementation of this embodiment of this application, the characteristic parameter may further include a rate fluctuation coefficient. The rate fluctuation coefficient may be, for example, a rate variance, a rate standard deviation, or a ratio of a standard deviation to a packet flow average rate.

In an implementation, when the characteristic parameter of the first packet flow includes the rate fluctuation coefficient of the first packet flow, during specific implementation, S102 may be, for example, as follows: The network device may determine a rate of the first packet flow based on an obtained packet of the first packet flow and based on a second cycle in a first time period. In an actual application, the first time period may include a plurality of second cycles. Therefore, the network device may determine a plurality of rates in the first time period. For example, the network device determines a rate $v_0$ at a moment $t_1$ of the first time period based on a plurality of obtained packets, and determines a rate vi at a moment $t_1+T$ of the first time period based on a plurality of obtained packets. By analogy, the network device may determine a rate $v_n$ at a moment $t_1+n*T$ of the first time period based on a plurality of obtained packets. After determining (n+1) rates, the network device may calculate the rate fluctuation coefficient of the first packet flow based on the (n+1) rates. Specifically, when the rate fluctuation coefficient of the first packet flow is the rate variance, the network device may obtain the rate variance through calculation according to a variance calculation formula. When the rate fluctuation coefficient of the first packet flow is the rate standard deviation, the network device may obtain the rate standard deviation through calculation according to a standard deviation calculation formula. Certainly, to avoid occupying a relatively large quantity of storage resources when the network device caches the (n+1) rates, in this embodiment of this application, the network device may alternatively obtain the rate variance through calculation according to a recursive variance formula. In the manner of using the recursive formula, the network device may store only one variance and one rate average rather than the (n+1) rates. When continuing to obtain a rate through calculation, the network device may obtain a variance through calculation based on the stored rate average, the stored variance, and the rate obtained through calculation currently. For example, when the rate $v_n$ is obtained through calculation, a new rate average may be obtained through calculation based on the rate $v_n$ and the stored rate average, and then a new variance is obtained through calculation based on the new rate average and the stored variance. Recursive formulas of the average and variance are classical formulas in statistics, and therefore are not described herein in detail. It should be noted that, the calculating a rate of the first packet flow based on a second cycle may be performed by the CPU. Specifically, the NP may send a total quantity of bytes of a packet received in a current cycle to the CPU based on the second cycle, and the CPU calculates the rate based on the received total quantity of bytes.

In an embodiment, the characteristic parameter of the first packet flow may include one or two of the packet time interval of the first packet flow and the rate fluctuation coefficient of the first packet flow.

S103. The network device determines a forwarding policy of the first packet flow based on the characteristic parameter of the first packet flow, where the forwarding policy of the first packet flow is used to indicate the latency sensitivity of the first packet flow.

In this embodiment of this application, the forwarding policy is used to indicate a specific packet flow forwarding manner. Considering that in an actual application, when forwarding a packet flow, the network device usually needs to determine a priority of the packet flow, to determine a packet egress queue that the packet flow is to enter. In addition, in a process of forwarding the packet flow, a forwarding path of the packet flow may be further determined. For example, the packet flow is forwarded based on a shortest path. For another example, the packet flow is forwarded based on a path with an optimal latency. For another example, the packet flow is forwarded based on a path with an optimal bandwidth. For another example, the packet flow is forwarded through a tunnel. Therefore, in some embodiments, the forwarding policy may include any one or two of a packet priority and a forwarding path. The packet flow priority is directly proportional to packet flow latency sensitivity. To be specific, higher packet flow latency sensitivity corresponds to a higher packet flow priority. In this way, an actual packet flow transmission latency can match the packet flow latency sensitivity. Transmission quality of the forwarding path is directly proportional to the packet flow latency sensitivity. To be specific, higher packet flow latency sensitivity indicates higher transmission quality of the forwarding path. The transmission quality mentioned herein may include the transmission latency. Higher transmission quality corresponds to a lower transmission latency. In this way, an actual packet flow transmission latency can match the packet flow latency sensitivity.

As described above, the characteristic parameter of the first packet flow includes the packet time interval of the first packet flow and/or the rate fluctuation coefficient of the first packet flow. The following describes specific implementations of S103 with reference to content specifically included in the characteristic parameter of the first packet flow.

Implementation 1: The characteristic parameter of the first packet flow includes the packet time interval of the first packet flow and does not include the rate fluctuation coefficient of the first packet flow.

As described above, a packet flow with low latency sensitivity has a relatively large packet time interval, for example, maximum packet time interval. A packet flow with high latency sensitivity has a relatively small packet time interval. Therefore, the network device may compare the time interval of the first packet flow with a first threshold. When the time interval of the first packet flow is less than the first threshold, the network device may determine that the forwarding policy of the first packet flow is a first forwarding policy. The first forwarding policy indicates that the first packet flow has high latency sensitivity. For example, the first forwarding policy indicates that the first packet flow has a high packet flow priority, or the first forwarding policy indicates that the forwarding path of the first packet flow is an optimal path. The first threshold mentioned herein may be delivered by a network management device to the network device, or may be preconfigured by a network administrator on the network device, and is not specifically limited in this embodiment of this application. Correspondingly, when the network device determines that the packet time interval of the first packet flow is greater than or equal to the first threshold, the network device may determine that the forwarding policy of the first packet flow is a second forwarding policy. The second forwarding policy indicates that the first packet flow has low latency sensitivity. For example, the second forwarding policy indicates that the first packet flow has a low packet flow priority, or the second forwarding policy indicates that the forwarding path of the first packet flow is a relatively optimal path.

In some embodiments, to enable the determined forwarding policy of the first packet flow to match the latency sensitivity of the first packet flow to a higher degree, in this embodiment of this application, the latency sensitivity of the first packet flow may be further classified at a finer granularity. For example, when the packet time interval of the first packet flow is greater than or equal to the first threshold and is less than or equal to a third threshold, it is determined that the forwarding policy of the first packet flow is a third forwarding policy. The third forwarding policy indicates that the first packet flow has relatively high latency sensitivity. When the packet time interval of the first packet flow is greater than the third threshold, it is determined that the forwarding policy of the first packet flow is the second forwarding policy. The second forwarding policy indicates that the first packet flow has low latency sensitivity.

Implementation 2: The characteristic parameter of the first packet flow includes the rate fluctuation coefficient of the first packet flow and does not include the packet time interval of the first packet flow.

As described above, a rate of a packet flow with high latency sensitivity is usually relatively stable, and a rate of a packet flow with low latency sensitivity fluctuates relatively greatly. In other words, a packet flow with high latency sensitivity has a relatively small rate fluctuation coefficient, and a packet flow with relatively low latency sensitivity has a relatively large rate fluctuation coefficient. Therefore, the network device may compare the rate fluctuation coefficient of the first packet flow with a second threshold. When the rate fluctuation coefficient of the first packet flow is less than the second threshold, the network device may determine that the forwarding policy of the first packet flow is a first forwarding policy. The first forwarding policy indicates that the first packet flow has high latency sensitivity. The second threshold mentioned herein may be delivered by a network management device to the network device, or may be preconfigured by a network administrator on the network device, and is not specifically limited in this embodiment of this application. Correspondingly, when the network device determines that the rate fluctuation coefficient of the first packet flow is greater than or equal to the second threshold, the network device may determine that the forwarding policy of the first packet flow is a second forwarding policy. The second forwarding policy indicates that the first packet flow has low latency sensitivity.

In some embodiments, to enable the determined forwarding policy of the first packet flow to match the latency sensitivity of the first packet flow to a higher degree, in this embodiment of this application, the latency sensitivity of the first packet flow may be further classified at a finer granularity. For example, when the rate fluctuation coefficient of the first packet flow is greater than or equal to a second threshold and is less than or equal to a fourth threshold, it is determined that the forwarding policy of the first packet flow is a third forwarding policy. The third forwarding policy indicates that the first packet flow has relatively high latency sensitivity. When the rate fluctuation coefficient of the first packet flow is greater than the fourth threshold, it is determined that the forwarding policy of the first packet flow is the second forwarding policy. The second forwarding policy indicates that the first packet flow has low latency sensitivity.

Implementation 3: The characteristic parameter of the first packet flow includes the packet time interval of the first packet flow and the rate fluctuation coefficient of the first packet flow.

When the characteristic parameter of the first packet flow includes the packet time interval of the first packet flow and the rate fluctuation coefficient of the first packet flow, the network device may compare the time interval of the first packet flow with a first threshold, and compare the rate fluctuation coefficient of the first packet flow with a second threshold. When the packet time interval of the first packet flow is less than the first threshold and the rate fluctuation coefficient of the first packet flow is less than the second threshold, the network device may determine that the forwarding policy of the first packet flow is a first forwarding policy. The first forwarding policy indicates that the first packet flow has high latency sensitivity.

Certainly, to enable the determined forwarding policy of the first packet flow to match the latency sensitivity of the first packet flow to a higher degree, in this embodiment of this application, the latency sensitivity of the first packet flow may be further classified at a finer granularity. Specifically, when the packet time interval of the first packet flow is greater than or equal to the first threshold, a third threshold may be further used, and the packet time interval of the first packet flow is compared with the third threshold to obtain a first comparison result. Correspondingly, when the rate fluctuation coefficient of the first packet flow is greater than or equal to the second threshold, a fourth threshold may be further used, and the rate fluctuation coefficient of the first packet flow is compared with the fourth threshold to obtain a second comparison result. Then, the forwarding policy of the first packet flow is determined based on the first comparison result and the second comparison result. For example, if the first comparison result is that the packet time interval of the first packet flow is greater than or equal to the first threshold and is less than or equal to the third threshold, and the second comparison result is that the rate fluctuation coefficient of the first packet flow is greater than or equal to the second threshold and is less than or equal to the fourth threshold, it is determined that the forwarding policy of the first packet flow is a third forwarding policy. The third forwarding policy indicates that the first packet flow has relatively high latency sensitivity. For another example, if the first comparison result is that the packet time interval of the first packet flow is greater than or equal to the first threshold and is less than or equal to the third threshold, and the second comparison result is that the rate fluctuation coefficient of the first packet flow is greater than the fourth threshold, it is determined that the forwarding policy of the first packet flow is a second forwarding policy. The second forwarding policy indicates that the first packet flow has low latency sensitivity. For still another example, if the first comparison result is that the packet time interval of the first packet flow is greater than the third threshold, and the second comparison result is that the rate fluctuation coefficient of the first packet flow is greater than or equal to the second threshold and is less than or equal to the fourth threshold, it is determined that the forwarding policy of the first packet flow is a second forwarding policy. The second forwarding policy indicates that the first packet flow has low latency sensitivity.

In this embodiment of this application, after determining the forwarding policy of the first packet flow, the network device may store a correspondence between a flow identifier of the first packet flow and the forwarding policy of the first packet flow. For example, the network device may store the correspondence in a flow table. In this way, when the network device continues to obtain a first packet of the first packet flow, the network device may determine the forwarding policy of the first packet flow based on the correspondence, to forward the first packet based on the forwarding policy of the first packet flow. In this embodiment of this application, the network device may first cache the plurality of packets of the first packet flow that are mentioned in S101, and forward the plurality of packets based on the forwarding policy of the first packet flow after determining the forwarding policy of the first packet flow in S103. Certainly, the network device may alternatively forward the plurality of packets based on a conventional elephant flow forwarding policy. In addition, in this embodiment of this application, the network device may periodically perform S101 to S103 to update the correspondence. Therefore, the network device may forward the plurality of packets mentioned in S101 based on a forwarding policy that is of the first packet flow and that is stored in the network device when the plurality of packets are obtained. For example, the plurality of packets include a second packet. When obtaining the second packet, the network device stores a correspondence between the flow identifier of the first packet flow and the first forwarding policy. Therefore, after obtaining the second packet, the network device may forward the second packet based on the first forwarding policy. After performing S103, the network device determines that the forwarding policy of the first packet flow is the second forwarding policy. Therefore, the network device updates the correspondence between the flow identifier of the first packet flow and the first forwarding policy to a correspondence between the flow identifier of the first packet flow and the second forwarding policy. If the network device continues to obtain a first packet of the first packet flow, the network device may forward the first packet based on the second forwarding policy.

It can be learned from the foregoing description that the solution provided in this embodiment of this application may be used to make the actual transmission latency of the first packet flow used as an elephant flow match the latency sensitivity of the first packet flow, thereby shortening the transmission latency of the first packet flow used as an elephant flow.

As described above, in an embodiment, the first threshold and the second threshold may be delivered by the network management device to the network device. Specifically, the network management device may first determine the first threshold and the second threshold, and then deliver the first threshold and the second threshold to the network device. In an embodiment, for example, the network device may obtain a plurality of packet flows corresponding to latency sensitivity, collect statistics on packet time intervals and rate fluctuation coefficients of the plurality of packet flows, and obtain the first threshold and the second threshold based on a statistical result. For example, the network management device collects statistics on packet flows corresponding to services with high latency sensitivity, to obtain a distribution range of packet time intervals of these packet flows and a distribution range of rate fluctuation coefficients of these packet flows. Then, the network management device may obtain the first threshold based on the distribution range of the packet time intervals, and obtain the second threshold based on the distribution range of the rate fluctuation coefficients. For example, if the network management device collects statistics on packet flows of a plurality of video conferencing services, and determines that packet time intervals of the plurality of packet flows are all less than m and rate fluctuation coefficients of the plurality of packet flows are all less than p, the network management device may determine m as the first threshold and determine p as the second threshold.

In some embodiments, in addition to the first packet flow, the network device may further receive a second packet flow, and the second packet flow is also an elephant flow. After receiving a plurality of packets of the second packet flow, the network device may calculate a characteristic parameter of the second packet flow based on the plurality of packets of the second packet flow, and determine a forwarding policy of the second packet flow based on the characteristic parameter of the second packet flow. The characteristic parameter of the second packet flow is used to indicate a transmission latency of the second packet flow, and the forwarding policy of the second packet flow is used to indicate latency sensitivity of the second packet flow. A specific implementation in which the network device calculates the characteristic parameter of the second packet flow based on the plurality of packets of the second packet flow is the same as the specific implementation in which the network device calculates the characteristic parameter of the first packet flow based on the plurality of packets of the first packet flow. Refer to the related description part of S102. Details are not described herein again. A specific implementation in which the network device determines the forwarding policy of the second packet flow based on the characteristic parameter of the second packet flow is the same as the specific implementation in which the network device determines the forwarding policy of the first packet flow based on the characteristic parameter of the first packet flow. Refer to the related description part of S103. Details are not described herein again.

As described above, after determining the forwarding policy of the first packet flow, the network device may forward the first packet flow based on the forwarding policy of the first packet flow. Correspondingly, after determining the forwarding policy of the second packet flow, the network device may forward the second packet flow based on the forwarding policy of the second packet flow. In some embodiments, if the latency sensitivity of the first packet flow is different from the latency sensitivity of the second packet flow, for example, the first packet flow is a packet flow of a video conferencing service and the second packet flow is a packet flow of a video on demand service, the packet flow priority indicated by the forwarding policy of the first packet flow is different from a packet flow priority indicated by the forwarding policy of the second packet flow, or costs of the forwarding path indicated by the forwarding policy of the first packet flow is different from costs of a forwarding path indicated by the forwarding policy of the second packet flow. In an embodiment, if the latency sensitivity of the first packet flow is higher than the latency sensitivity of the second packet flow, the packet flow priority indicated by the forwarding policy of the first packet flow is higher than the packet flow priority indicated by the forwarding policy of the second packet flow, or the costs of the forwarding path indicated by the forwarding policy of the first packet flow are lower than the costs of the forwarding path indicated by the forwarding policy of the second packet flow. Therefore, a latency of forwarding the first packet flow by the network device is lower than a latency of forwarding the second packet flow by the network device, so that a latency of forwarding a packet flow by the network device matches latency sensitivity of the packet flow.

In some embodiments, before performing S101, the network device may further perform a step of determining that the first packet flow is an elephant flow. Specifically, the network device may determine the rate of the first packet flow based on the plurality of packets, and determine, based on the rate of the first packet flow, whether the first packet flow is an elephant flow. For example, when the rate of the first packet flow is greater than a specific rate threshold, the network device may determine that the first packet flow is an elephant flow. Alternatively, the network device may sort rates of a plurality of obtained packet flows. When the rate of the first packet flow belongs to first N higher rates of the plurality of rates, the network device determines that the first packet flow is an elephant flow.

In some embodiments, considering that the network device obtains a large quantity of packet flows, to reduce workload of sorting rates of the packet flows by the network device, before sorting the rates of the packet flows, the network device may further perform pre-selection on the packet flows. Considering that a length of a packet of an elephant flow is usually relatively long, therefore, the network device may perform pre-selection on the packet flows based on, for example, packet lengths, and only when a length of a packet is greater than a specific length threshold, a rate of a packet flow to which the packet belongs is sorted. Otherwise, the packet flow is directly determined as a mice flow. Therefore, some mice flows are removed through selection, thereby reducing a quantity of packet flows that participate in sorting. In other words, in this embodiment of this application, when packet lengths of the plurality of packets of the first packet flow are all greater than or equal to the length threshold, the network device may continue to perform the step of calculating the rate of the first packet flow based on the plurality of packets of the first packet flow, and performing rate sorting based on the rate of the first packet flow to further determine whether the first packet flow is an elephant flow.

In some embodiments, considering that duration of the first packet flow may be relatively long, the rate of the first packet flow may fluctuate relatively greatly, and the foregoing first time period (namely, duration of the plurality of packets received in S101) may be a part of the duration of the first packet flow, a rate calculated based on only the plurality of packets received in S101 may not accurately represent the rate of the first packet flow. Therefore, in this embodiment of this application, during packet flow rate sorting, in addition to the plurality of packets received in S101, a historical rate of the first packet flow may be further considered during calculation of the rate. Specifically, because the network device may periodically perform S101 to S103, the network device may obtain an integrated rate of the first packet flow based on a first rate obtained through calculation in a current cycle and a second rate obtained through calculation in a previous cycle. When sorting is performed based on a packet flow rate, sorting may be performed by using the integrated rate. Specifically, the integrated rate of the first packet flow may be obtained through calculation according to the following formula: Integrated rate=Second rate*Attenuation coefficient+First rate. The attenuation coefficient is a number less than 1.

In addition, in an actual application, when the network device starts to receive the first packet flow, an integrated rate of the first packet flow may be relatively small because a relatively small quantity of packets of the first packet flow are received, and consequently the first packet flow may be determined as a mice flow during packet flow rate sorting. To avoid this case, a time threshold may be set. After receiving the first packet of the first packet flow, the network device sorts a rate of the first packet flow only after the time threshold expires, to avoid misidentifying the first packet flow as a mice flow.

In addition, as described above, in some embodiments, the network device may store the flow table that includes the correspondence between the flow identifier of the first packet flow and the forwarding policy of the first packet flow. To speed up updating of the flow table, when the network device receives a flow finish flag of the first packet flow, the network device may directly delete the correspondence between the flow identifier of the first packet flow and the forwarding policy of the first packet flow from the flow table. The finish flag of the first packet flow may be determined based on, for example, a finish (FIN) flag bit in a packet.

It should be noted that the technical solution provided in this embodiment of this application may be applied to a network edge node as a flow classification technology. If all other nodes in a network can correctly receive a forwarding policy determined by a network edge node, the other nodes in the network may not need to perform the solution provided in this embodiment of this application. If the other nodes in the network cannot correctly receive the forwarding policy determined by the network edge node, the other nodes in the network may perform the solution provided in this embodiment of this application. Therefore, in a process of forwarding the first packet flow, a forwarding policy determined by each forwarding node matches the latency sensitivity of the first packet flow, so that the actual transmission latency of the first packet flow matches the latency sensitivity of the first packet flow, thereby ensuring quality of service of a service corresponding to the first packet flow.

Figure 3:
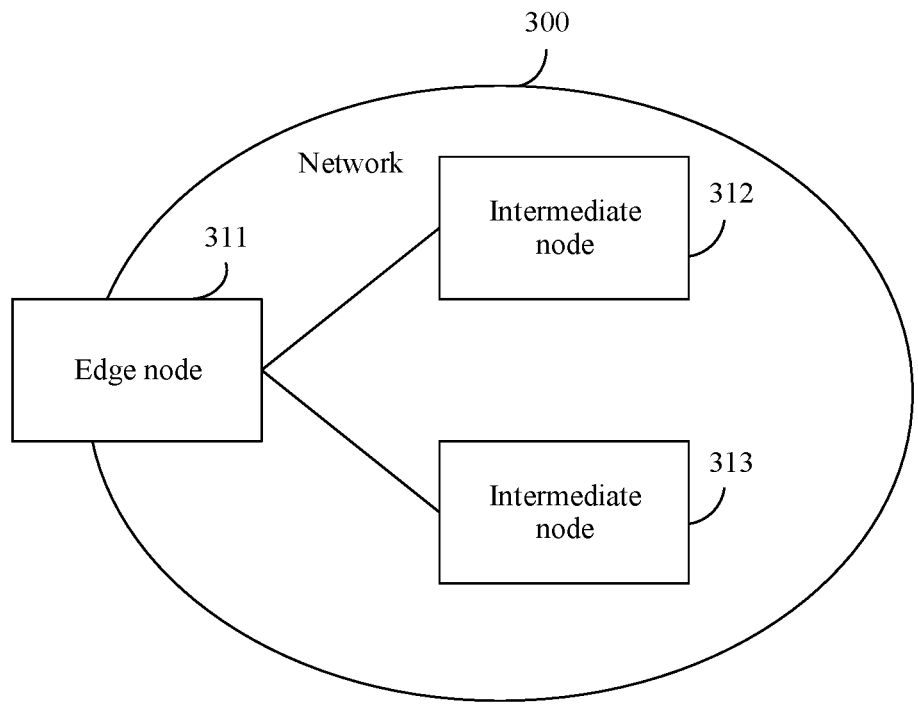
FIG. 3 is a schematic structural diagram of a network according to an embodiment of this application.

Refer to FIG. 3 for understanding. FIG. 3 is a schematic structural diagram of a network 300 according to an embodiment of this application. In FIG. 3, the network 300 includes an edge node 311, an intermediate node 312, and an intermediate node 313. The edge node 311 may perform the solution in this embodiment of this application to determine the forwarding policy of the first packet flow. For example, if the edge node 311 determines that the first packet flow has a high priority, after obtaining a first packet, the edge node 311 may modify a value of a differentiated services code point (DSCP) field in the first packet, to enable the value of the field to indicate that the first packet flow has a high priority. Then, the edge node 311 forwards the first packet to the intermediate node 312. If the intermediate node 312 can correctly identify the value of the DSCP field in the first packet, the intermediate node 312 may directly forward the first packet based on the value of the DSCP field. If the intermediate node 312 cannot correctly identify the value of the DSCP field in the first packet, the intermediate node may perform the solution provided in this embodiment of this application, to determine a forwarding policy of the first packet, and forward the first packet based on the determined forwarding policy.

Figure 4:
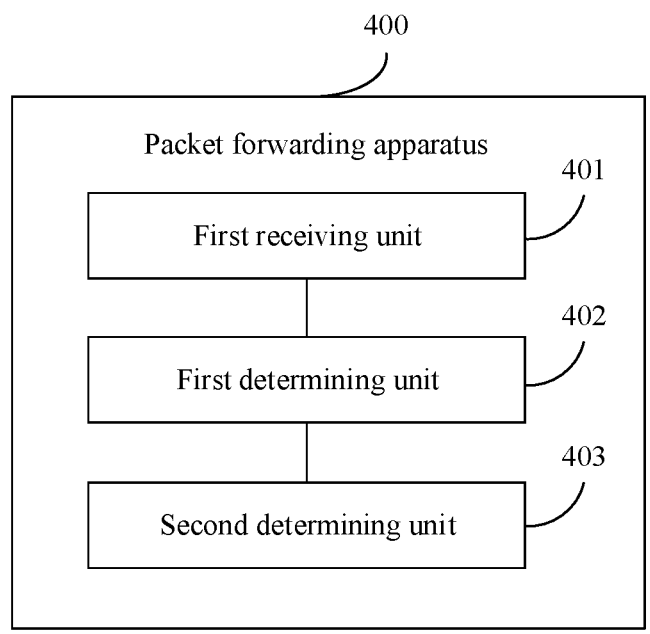
FIG. 4 is a schematic structural diagram of a packet forwarding apparatus according to an embodiment of this application.

Based on the packet forwarding method provided in the foregoing embodiment, an embodiment of this application further provides a corresponding apparatus. The following describes the apparatus with reference to the accompanying drawings. FIG. 4 is a schematic structural diagram of a packet forwarding apparatus 400 according to an embodiment of this application. The packet forwarding apparatus 400 shown in FIG. 4 may be applied to the network management device mentioned in the foregoing embodiment, and is configured to perform the packet forwarding method shown in FIG. 2. Specifically, the packet forwarding apparatus 400 may include a first receiving unit 401, a first determining unit 402, and a second determining unit 403.

The first receiving unit 401 is configured to receive a plurality of packets of a first packet flow, where the first packet flow is an elephant flow.

The first determining unit 402 is configured to determine a characteristic parameter of the first packet flow based on the plurality of packets, where the characteristic parameter is used to indicate a transmission latency of the first packet flow.

The second determining unit 403 is configured to determine a forwarding policy of the first packet flow based on the characteristic parameter of the first packet flow, where the forwarding policy is used to indicate latency sensitivity of the first packet flow.

In an implementation, the characteristic parameter includes a packet time interval and/or a rate fluctuation coefficient. The packet time interval is a difference between receiving moments of two adjacent packets in the plurality of packets, and the rate fluctuation coefficient is used to indicate a rate change of the first packet flow.

In an implementation, the forwarding policy includes a packet flow priority and/or a forwarding path. The packet flow priority is directly proportional to packet flow latency sensitivity, and transmission quality of the forwarding path is directly proportional to the packet flow latency sensitivity.

In an implementation, when the characteristic parameter of the first packet flow includes the packet time interval of the first packet flow, the first determining unit 402 is specifically configured to: determine a quantity of obtained packets of the first packet flow based on a first cycle in a first time period; and if none of quantities of packets obtained for K consecutive times changes, determine that the packet time interval is K times the first cycle, where the plurality of packets are packets obtained in the first time period.

In an implementation, when the characteristic parameter of the first packet flow includes the rate fluctuation coefficient of the first packet flow, the first determining unit 402 is specifically configured to determine a rate of the first packet flow based on an obtained packet of the first packet flow and based on a second cycle in a first time period, where the plurality of packets are packets obtained in the first time period; and calculate the rate fluctuation coefficient of the first packet flow based on a plurality of rates determined in the first time period.

In an implementation, when the characteristic parameter includes the packet time interval and does not include the rate fluctuation coefficient, the second determining unit 403 is specifically configured to: when the packet time interval of the first packet flow is less than a first threshold, determine that the forwarding policy of the first packet flow is a first forwarding policy, where the first forwarding policy indicates that the first packet flow has high latency sensitivity.

When the characteristic parameter includes the rate fluctuation coefficient and does not include the packet time interval, the second determining unit 403 is specifically configured to: when the rate fluctuation coefficient of the first packet flow is less than a second threshold, determine that the forwarding policy of the first packet flow is a first forwarding policy, where the first forwarding policy indicates that the first packet flow has high latency sensitivity.

When the characteristic parameter includes the packet time interval and the rate fluctuation coefficient, the second determining unit 403 is specifically configured to: when the packet time interval of the first packet flow is less than a first threshold and the rate fluctuation coefficient of the first packet flow is less than a second threshold, determine that the forwarding policy of the first packet flow is a first forwarding policy, where the first forwarding policy indicates that the first packet flow has high latency sensitivity.

In an implementation, the apparatus further includes a second receiving unit and a forwarding unit.

The second receiving unit is configured to receive a second packet flow, where the second packet flow is an elephant flow.

The forwarding unit is configured to forward the first packet flow based on the forwarding policy of the first packet flow, and forward the second packet flow based on a forwarding policy of the second packet flow, where the packet flow priority indicated by the forwarding policy of the first packet flow is higher than a packet flow priority indicated by the forwarding policy of the second packet flow.

In an implementation, the apparatus further includes a second receiving unit and a forwarding unit.

The second receiving unit is configured to receive a second packet flow, where the second packet flow is an elephant flow, and a destination device of the second packet flow is the same as a destination device of the first packet flow.

The forwarding unit is configured to forward the first packet flow based on the forwarding policy of the first packet flow, and forward the second packet flow based on a forwarding policy of the second packet flow, where costs of the forwarding path indicated by the forwarding policy of the first packet flow are lower than costs of a forwarding path indicated by the forwarding policy of the second packet flow.

The apparatus 400 is an apparatus corresponding to the packet forwarding method described in the foregoing embodiment, and specific implementations of the units of the apparatus 400 are all based on the same concept as the foregoing method embodiment. Therefore, for the specific implementations of the units of the apparatus 400, refer to the description part of the foregoing method embodiment. Details are not described herein again.

Figure 5:
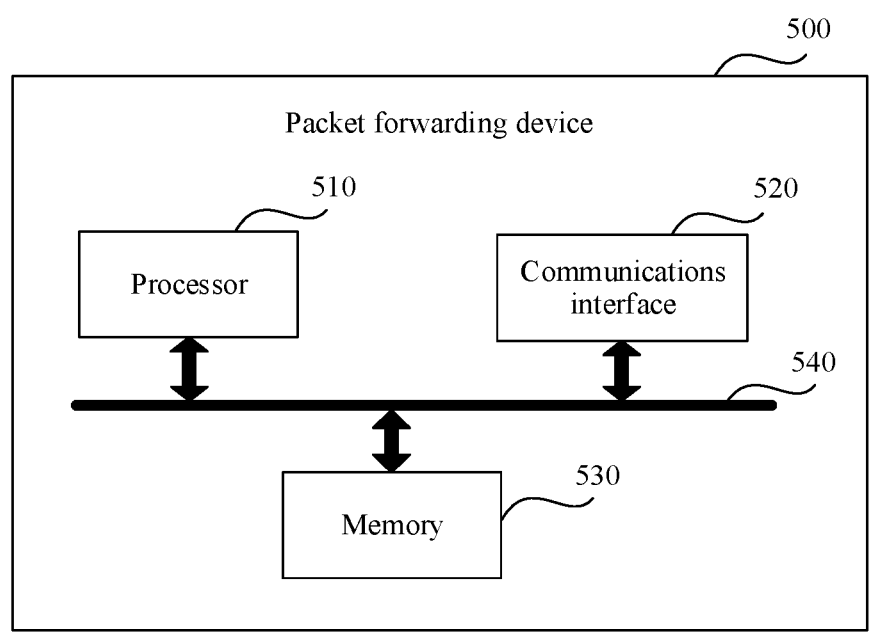
FIG. 5 is a schematic structural diagram of a packet forwarding device according to an embodiment of this application.

It should be noted that a hardware structure of the foregoing mentioned packet forwarding apparatus 400 may be a structure shown in FIG. 5. FIG. 5 is a schematic structural diagram of a packet forwarding device 500 according to an embodiment of this application.

Referring to FIG. 5, the packet forwarding device 500 includes a processor 510, a communications interface 520, and a memory 530. There may be one or more processors 510 in the packet forwarding device 500. In FIG. 5, one processor is used as an example. In this embodiment of this application, the processor 510, the communications interface 520, and the memory 530 may be connected through a bus system or in another manner. An example in which the connection is performed through a bus system 540 is used in FIG. 5.

The processor 510 may be a CPU, an NP, or a combination of a CPU and an NP. The processor 510 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 530 may include a volatile memory, such as a random access memory (RAM); or the memory 530 may include a nonvolatile memory, such as a flash memory, a hard disk drive (HDD), or a solid state drive (SSD); or the memory 530 may include a combination of the foregoing memories. For example, the memory 530 may store the foregoing correspondence between the flow identifier and the forwarding policy.

Optionally, the memory 530 stores an operating system and a program, an executable module or a data structure, or a subset thereof, or an extended set thereof. The program may include various operation instructions, used to implement various operations. The operating system may include various system programs, configured to implement various basic services and process hardware-based tasks. The processor 510 may read the program from the memory 530, to implement the packet forwarding method provided in the embodiment of this application.

The bus system 540 may be a peripheral component interconnect (PCI) bus, an extended industry standard architecture (EISA) bus, or the like. The bus system 540 may be classified as an address bus, a data bus, a control bus, or the like. For ease of representation, only one thick line is used to represent the bus system 540 in FIG. 5, but this does not mean that there is only one bus or only one type of bus.

An embodiment of this application further provides a computer-readable storage medium, including an instruction or a computer program. When the instruction or the computer program is run on a computer, the computer is enabled to perform the packet forwarding method provided in the foregoing embodiment.

An embodiment of this application further provides a computer program product including an instruction or a computer program. When the computer program product is run on a computer, the computer is enabled to perform the packet forwarding method provided in the foregoing embodiment.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those expressly listed steps or units, but may include other steps or units that are not expressly listed or inherent to such a process, method, system, product, or device.

It may be clearly understood by persons skilled in the art that, for the purpose of convenient and brief description, for a detailed working process of the foregoing described system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the foregoing described apparatus embodiment is merely an example. For example, division in to the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, the service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, the services described in the present application may be implemented by using hardware, software, firmware, or any combination thereof. When the present application is implemented by using software, the services may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the present application are further described in detail. It should be understood that the foregoing descriptions are merely specific implementations of the present application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A packet forwarding method comprising:
receiving, by a network device, a plurality of packets of a first packet flow, wherein the first packet flow is an elephant flow;
determining, by the network device, a characteristic parameter of the first packet flow based on the plurality of packets, wherein the characteristic parameter indicates a transmission latency of the first packet flow; and
determining, by the network device, a forwarding policy of the first packet flow based on the characteristic parameter of the first packet flow, wherein the forwarding policy indicates latency sensitivity of the first packet flow,
wherein the forwarding policy of the first packet flow comprises a packet flow priority, and wherein the packet flow priority is directly proportional to packet flow latency sensitivity;
wherein the characteristic parameter comprises:
a packet time interval and/or a rate fluctuation coefficient, wherein the packet time interval is a difference between moments at which the network device receives two adjacent packets in the plurality of packets, and the rate fluctuation coefficient indicates a rate change of the first packet flow;
wherein in response to the characteristic parameter of the first packet flow comprising the packet time interval of the first packet flow, the determining the characteristic parameter of the first packet flow based on the plurality of packets comprises:
determining, by the network device, a quantity of obtained packets of the first packet flow based on a first cycle in a first time period, and in response to each quantity of obtained packets of the first packet flow not changing for K consecutive times, determining that the packet time interval is K times the first cycle, wherein the plurality of packets are packets obtained in the first time period, and K is a positive integer.

2. The method according to claim 1, wherein the forwarding policy of the first packet flow further comprises:
a forwarding path, and wherein transmission quality of the forwarding path is directly proportional to the packet flow latency sensitivity.

3. The method according to claim 1, wherein in response to the characteristic parameter of the first packet flow comprises the rate fluctuation coefficient of the first packet flow, the determining the characteristic parameter of the first packet flow based on the plurality of packets comprises:
determining, by the network device, a rate of the first packet flow based on an obtained packet of the first packet flow and based on a second cycle in a first time period, wherein the plurality of packets are packets obtained in the first time period; and
determining, by the network device, the rate fluctuation coefficient of the first packet flow based on a plurality of rates determined in the first time period.

4. The method according to claim 1, wherein
in response to the characteristic parameter comprising the packet time interval and not comprising the rate fluctuation coefficient, the determining the forwarding policy of the first packet flow based on the characteristic parameter of the first packet flow comprises:
in response to the packet time interval of the first packet flow being less than a first threshold, determining that the forwarding policy of the first packet flow is a first forwarding policy, wherein the first forwarding policy indicates that the first packet flow has higher latency sensitivity than a packet flow with a packet time interval being more than the first threshold.

5. The method according to claim 1, further comprising:
receiving, by the network device, a second packet flow, wherein the second packet flow is an elephant flow; and
forwarding, by the network device, the first packet flow based on the forwarding policy of the first packet flow, and forwarding, by the network device, the second packet flow based on a forwarding policy of the second packet flow, wherein the packet flow priority indicated by the forwarding policy of the first packet flow is higher than a packet flow priority indicated by the forwarding policy of the second packet flow.

6. The method according to claim 1, further comprising:
receiving, by the network device, a second packet flow, wherein the second packet flow is an elephant flow, and a destination device of the second packet flow is the same as a destination device of the first packet flow; and
forwarding, by the network device, the first packet flow based on the forwarding policy of the first packet flow, and forwarding, by the network device, the second packet flow based on a forwarding policy of the second packet flow, wherein costs of a forwarding path indicated by the forwarding policy of the first packet flow are lower than costs of a forwarding path indicated by the forwarding policy of the second packet flow.

7. The method according to claim 1, wherein
in response to the characteristic parameter comprising the rate fluctuation coefficient and not comprising the packet time interval, the determining the forwarding policy of the first packet flow based on the characteristic parameter of the first packet flow comprises:
in response to the rate fluctuation coefficient of the first packet flow being less than a second threshold, determining that the forwarding policy of the first packet flow is a first forwarding policy, wherein the first forwarding policy indicates that the first packet flow has higher latency sensitivity than a packet flow with a rate fluctuation coefficient being more than the second threshold.

8. The method according to claim 1, wherein
in response to the characteristic parameter comprising the packet time interval and the rate fluctuation coefficient, the determining the forwarding policy of the first packet flow based on the characteristic parameter of the first packet flow comprises:
in response to the packet time interval of the first packet flow being less than a first threshold and the rate fluctuation coefficient of the first packet flow being less than a second threshold, determining that the forwarding policy of the first packet flow is a first forwarding policy, wherein the first forwarding policy indicates that the first packet flow has higher latency sensitivity than a packet flow with a packet time interval being more than the first threshold and a rate fluctuation coefficient being more than the second threshold.

9. A packet forwarding apparatus comprising:
a non-transitory memory storing instructions; and
a processor coupled to the non-transitory memory; wherein the instructions, when executed by the processor, cause the packet forwarding apparatus to be configured to:

receive a plurality of packets of a first packet flow, wherein the first packet flow is an elephant flow;

determine a characteristic parameter of the first packet flow based on the plurality of packets, wherein the characteristic parameter indicates a transmission latency of the first packet flow; and determine a forwarding policy of the first packet flow based on the characteristic parameter of the first packet flow, wherein the forwarding policy indicates latency sensitivity of the first packet flow, wherein the forwarding policy of the first packet flow comprises a packet flow priority, and wherein the packet flow priority is directly proportional to packet flow latency sensitivity;

wherein the characteristic parameter comprises:

a packet time interval and/or a rate fluctuation coefficient, wherein the packet time interval is a difference between receiving moments of two adjacent packets in the plurality of packets, and the rate fluctuation coefficient indicates a rate change of the first packet flow;

wherein in response to the characteristic parameter of the first packet flow comprising the packet time interval of the first packet flow, the instructions, when executed by the processor, further cause the packet forwarding apparatus to be configured to:

determine a quantity of obtained packets of the first packet flow based on a first cycle in a first time period, and in response to each quantity of obtained packets of the first packet flow not changing for K consecutive times, determine that the packet time interval is K times the first cycle, wherein the plurality of packets are packets obtained in the first time period, and K is a positive integer.

10. The apparatus according to claim 9, wherein the forwarding policy of the first packet flow further comprises:

a forwarding path, and wherein transmission quality of the forwarding path is directly proportional to the packet flow latency sensitivity.

11. The apparatus according to claim 9, wherein when the characteristic parameter of the first packet flow comprises the rate fluctuation coefficient of the first packet flow, the instructions, when executed by the processor, further cause the packet forwarding apparatus to be configured to:

determine a rate of the first packet flow based on an obtained packet of the first packet flow and based on a second cycle in a first time period, wherein the plurality of packets are packets obtained in the first time period; and determine the rate fluctuation coefficient of the first packet flow based on a plurality of rates determined in the first time period.

12. The apparatus according to claim 9, wherein when the characteristic parameter comprises the packet time interval and does not comprise the rate fluctuation coefficient, the instructions, when executed by the processor, further cause the packet forwarding apparatus to be configured to:

when the packet time interval of the first packet flow is less than a first threshold, determine that the forwarding policy of the first packet flow is a first forwarding policy, wherein the first forwarding policy indicates that the first packet flow has higher latency sensitivity than a packet flow with a packet time interval being more than the first threshold.

13. The apparatus according to claim 9, wherein the instructions, when executed by the processor, further cause the packet forwarding apparatus to be configured to:

receive a second packet flow, wherein the second packet flow is an elephant flow; and forward the first packet flow based on the forwarding policy of the first packet flow, and forward the second packet flow based on a forwarding policy of the second packet flow, wherein the packet flow priority indicated by the forwarding policy of the first packet flow is higher than a packet flow priority indicated by the forwarding policy of the second packet flow.

14. The apparatus according to claim 9, wherein the instructions, when executed by the processor, further cause the packet forwarding apparatus to be configured to:

receive a second packet flow, wherein the second packet flow is an elephant flow, and a destination device of the second packet flow is the same as a destination device of the first packet flow; and forward the first packet flow based on the forwarding policy of the first packet flow, and forward the second packet flow based on a forwarding policy of the second packet flow, wherein costs of a forwarding path indicated by the forwarding policy of the first packet flow are lower than costs of a forwarding path indicated by the forwarding policy of the second packet flow.

15. The apparatus according to claim 9, wherein when the characteristic parameter comprises the rate fluctuation coefficient and does not comprise the packet time interval, the instructions, when executed by the processor, further cause the packet forwarding apparatus to be configured to:

when the rate fluctuation coefficient of the first packet flow is less than a second threshold, determine that the forwarding policy of the first packet flow is a first forwarding policy, wherein the first forwarding policy indicates that the first packet flow has higher latency sensitivity than a packet flow with a rate fluctuation coefficient being more than the second threshold.

16. The apparatus according to claim 9, wherein when the characteristic parameter comprises the packet time interval and the rate fluctuation coefficient, the instructions, when executed by the processor, further cause the packet forwarding apparatus to be configured to:

when the packet time interval of the first packet flow is less than a first threshold and the rate fluctuation coefficient of the first packet flow is less than a second threshold, determine that the forwarding policy of the first packet flow is a first forwarding policy, wherein the first forwarding policy indicates that the first packet flow has higher latency sensitivity than a packet flow with a packet time interval being more than the first threshold and a rate fluctuation coefficient being more than the second threshold.

\* \* \* \* \*